United States Patent
Olnowich et al.

[11] Patent Number: 5,922,063
[45] Date of Patent: Jul. 13, 1999

[54] AUTOMATIC HARDWARE MESSAGE HEADER GENERATOR

[75] Inventors: Howard Thomas Olnowich, Endwell; Michael Wayland Dotson, Binghamton; James William Feeney, Endicott; Robert Francis Lusch, Vestal; Michael Anthony Maniguet, Owego, all of N.Y.

[73] Assignee: International Business Machines Corporation, Armonk, N.Y.

[21] Appl. No.: 07/946,509

[22] Filed: Sep. 17, 1992

[51] Int. Cl.$^6$ .................................................. G06F 15/173
[52] U.S. Cl. ........................ 710/132; 710/131; 709/236; 709/237; 709/238; 709/243
[58] Field of Search ..................................... 395/800, 200, 395/200.07, 311, 312, 200.66, 200.68, 200.73, 200.67, 200.11; 340/825.8, 828.28

[56] References Cited

U.S. PATENT DOCUMENTS

| | | | |
|---|---|---|---|
| 4,707,827 | 11/1987 | Bione et al. | 370/85 |
| 4,897,799 | 1/1990 | Le Gall et al. | 364/514 |
| 4,965,788 | 10/1990 | Newman | 370/60 |
| 4,977,582 | 12/1990 | Nichols et al. | 375/118 |
| 5,107,489 | 4/1992 | Brown et al. | 370/58.2 |
| 5,175,733 | 12/1992 | Nugent | 370/94.3 |
| 5,198,808 | 3/1993 | Kudo | 340/825.8 |
| 5,220,562 | 6/1993 | Takada et al. | 370/85.13 |
| 5,250,943 | 10/1993 | Childs et al. | 340/825.8 |
| 5,264,842 | 11/1993 | Franaszek | 340/825.79 |
| 5,293,377 | 3/1994 | Gould | 370/94.1 |
| 5,345,229 | 9/1994 | Olnowich et al. | 340/825.8 |
| 5,347,632 | 9/1994 | Filepp et al. | 395/200 |
| 5,404,461 | 4/1995 | Olnowich et al. | 395/325 |

OTHER PUBLICATIONS

IBM TDB vol. 33, No. 5, Oct., 1990, "Asynchronous Digital Video Switching System", by Farrell et al, pp. 227–233.

*Primary Examiner*—Larry D. Donaghue
*Assistant Examiner*—John Fallansbee
*Attorney, Agent, or Firm*—David L. Adour; Eugene I. Shkurko; Shelley M. Beckstrand

[57] ABSTRACT

A method and apparatus for reducing the software overhead of message passing in parallel systems. Special purpose hardware assists in constructing each data message sent through a network. Message passing systems generally require that every message be prefixed with a message header describing the key control parameters of the message. The software task is to construct the message header for every message individually and to transmit the header prefixed to every message. The software is relieved of constructing the message header and uses special purpose hardware to accomplish the job more efficiently.

13 Claims, 10 Drawing Sheets

FIRST STAGE OF ALLNODE SWITCHES

SECOND STAGE OF ALLNODE SWITCHES

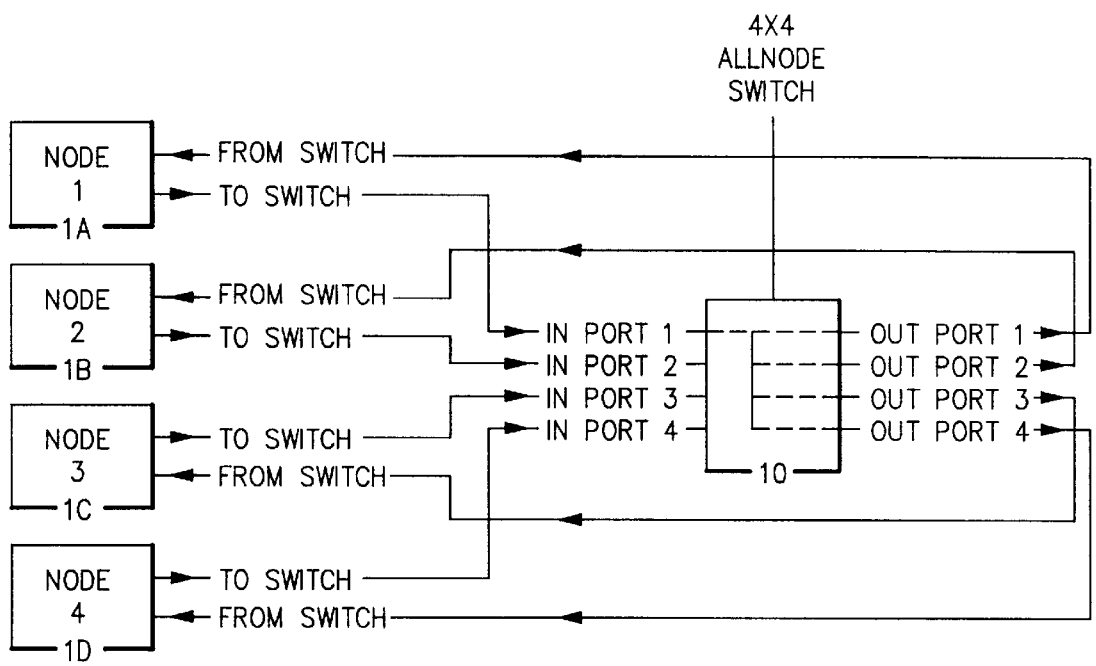
FIG.4
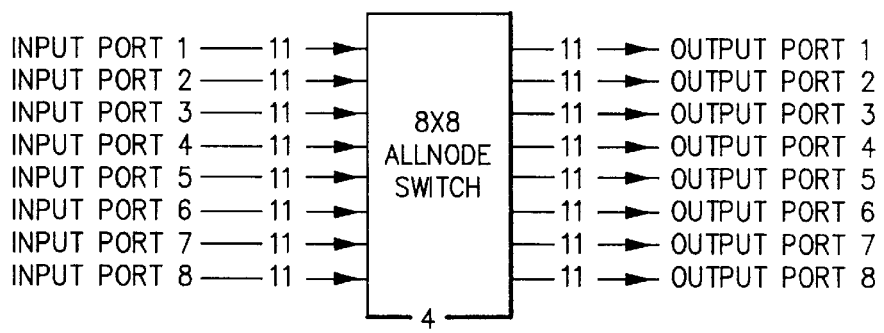
FIG.10
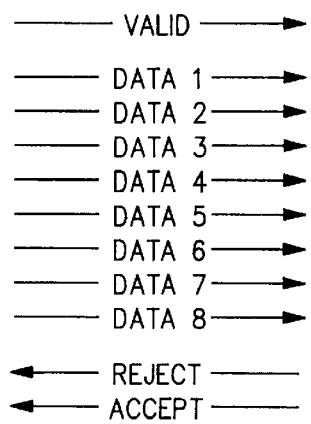

AUTOMATIC HARDWARE MESSAGE HEADER GENERATOR

RELATED APPLICATIONS

The present United States patent application claims priority and is related to the following applications:

U.S. Ser. No. 08/457,789, filed Jun. 2, 1995, entitled "All-Node Switch, An Unclocked, Unbuffered Asynchronous Switching Apparatus", by P. A. Franaszek, et al., a continuation of U.S. Ser. No. 08/143,977, filed Oct. 27, 1993, now abandoned, which was a continuation of U.S. Ser. No 07/677,543, filed Mar. 29, 1991, now abandoned, and U.S. Pat. No. 5,654,695, issued Aug. 5, 1997, entitled "Multi-Function Network", by H. T. Olnowich, et al., U.S. Pat. Nos. 5,444,705 and 5,680,402, entitled "Dual Priority Switching Apparatus for Simplex Networks", by H. T. Olnowich, et al., and U.S. Pat. Nos. 5,612,953 and 5,774,698, entitled "Multi-Media Serial Line Switching Adapter for Parallel Networks and Heterogenous and Homologous Computer Systems", by H. T. Olnowich, et al.

The present application is also related to the following applications filed concurrently herewith:

U.S. Pat. No. 5,384,773, entitled Multi-Media Analog/Digital/optical Switching Apparatus", by H. T. Olnowich, et al., and U.S. Pat. No. 5,495,474, entitled Switch-Based Micro-Channel Planar Apparatus", by H. T. Olnowich, et al., and U.S. Ser. No. 08/316,620, filed Sep. 17, 1992, entitled "Switch-Based Personal Computer Interconnection Apparatus", by H. T. Olnowich, et al., now abandoned, a continuation of U.S. Ser. No. 07/946,512, filed Sep. 17, 1992, now abandoned, and U.S. Ser. No. 08/286,107, filed Aug. 4, 1994, entitled "Slave MicroChannel Apparatus for Converting to Switch Architecture" by H. T. Olnowich, et al., a continuation of U.S. Ser. No. 07/947,644, filed Sep. 17, 1992, now abandoned, and U.S. Ser. No. 08/381,669, filed Jan. 30, 1995, entitled "Master MicroChannel Apparatus for Converting to Switch Architecture" by H. T. Olnowich, et al., now abandoned, a continuation of U.S. Ser. No. 07/946,506, filed Sep. 17, 1992, now abandoned, and U.S. Pat. No. 5,734,826, entitled "Variable Cyclic Redundancy Coding Method and Apparatus" by H. T. Olnowich, et al., and U.S. Ser. No. 07/947,010, filed Sep. 17, 1992

U.S. Pat. No. 5,345,229, entitled "Adaptive Switching Apparatus for Multi-Stage Networks" by H. T. Olnowich, et al., and U.S. Pat. No. 5,542,048, entitled "Increasing Probability Multi-Stage Network", by H. T. Olnowich, et al., a divisional of which is U.S. Ser. No. 08/625,379, filed Apr. 1, 1996, and U.S. Pat. No. 5,404,537, entitled "Priority Interrupt Switching Apparatus for Real Time Systems", by H. T. Olnowich, et al.

These applications and the present application are owned by one and the same assignee, International Business Machines Corporation of Armonk, N.Y.

The descriptions set forth in the previous applications and the concurrently filed applications are incorporated by reference. These applications and the present application are owned by one and the same assignee, namely, International Business Machines Corporation of Armonk, N.Y.

FIELD OF THE INVENTIONS

The present invention relates to digital computer systems comprised of several or many computing and/or input/output elements, and the ability of the said individual elements to perform high speed, low-latency communications with each other in a parallel fashion over a multi-stage, switching interconnection network.

The present invention also relates to digital computer systems and the ability to adapt personal computer and workstation systems that were designed to function as uniprocessors to function effectively as multi-processors; i.e., individual nodes of a message passing parallel system.

GLOSSARY OF TERMS

Alternate Path
  One of a plurality of connection paths that can be used to from a connection between a sending node and a receiving node through a multi-stage network.
Circuit-switched network
  A network where the individual switching elements comprising the network do not buffer the data messages, but pass them immediately as a direct connection from input to output.
Connection Path
  A route through a multi-stage network used to connect a sending node to a receiving node.
Data Message
  A format for sending information between nodes of a parallel system incorporating the further ability to check the said information for accuracy using cyclic redundancy coding methods.
Data
  Another term for Data Message
Idle
  The state of a switch interface where it is not presently involved in the process of connecting two nodes.
Message
  Another term for Data Message
Message Header
  Control information prefixed to each data message and used to control and route the message through the switch network to the selected receiving node.
Node
  A functional element of the system comprised of one or more processors or input/output devices interconnected by a network.
Nodal element
  Another term for node, which has the same meaning.
NRZ
  Abbreviation for non-return to zero.
Port
  A single bi-directional entry and exit point to a switching network.
Receiving Node
  A functional element which is receiving data transmitted over a network.
Sending Node
  A functional element which is transmitting data over a network.

BACKGROUND OF THE INVENTIONS

Multi-stage switching networks are gaining acceptance as a means for interconnecting multiple devices within modern digital computing systems. In particular, in parallel systems it is common to use a multi-staged switching network to interconnect n system elements, where n can be several or thousands of processors or combinations of processors and other system elements. However, most state-of-the-art processors are designed to function as uniprocessors and do not implement the functions normally required to function effectively as multi-processors. The problem becomes one of how to effectively adapt uniprocessor personal computer and workstation systems to function in a multi-processor environment.

As the field of parallel processing advances, it becomes important to leverage off of existing low cost, off-the-shelf uniprocessors. This will enable cost effective and timely parallel products to be available at the marketplace. What is required to accomplish this is an efficient way to convert existing uniprocessors to function as parallel processors with minimal complexity and cost. This will enable customers to use idle processors that they already own more efficiently and to add to the parallel system in a modularly growable fashion. One important factor in allowing uniprocessors to be used as nodes of parallel processing systems is the message passing concept. Using this concept, uniprocessors communicate with each other by sending data messages from one processor to another over a high speed interconnection means. If the interconnection means is a switch network, multiple uniprocessors can communicate simultaneously at high bandwidths and low latencies. The message passing concept solves the cache coherency problem amongst the parallel uniprocessors by making each uniprocessor responsible for its own cache coherency. When a processor sends or receives a message, each processor must handle any local cache coherency operations. However, other processors can not read or write a processors local memory, but must communicate by messages, instead of shared memory techniques. Therefore, there are no global caching problems.

Message passing techniques have some problems. As the field of parallel processing advances, the need for better performing message passing means becomes of prime importance. New high performance switches and networks have made it difficult for the message passing software to keep pace, and have emphasized the bottleneck caused by the software. For instance, new high speed switches like the ALLNODE switch, as described in U.S. Ser. No. 07/677, 543, are capable of passing a message in a few hundred nanoseconds, whereas the software time can range from several to 300 or more microseconds to send and receive a message. The problem posed is to find new and innovative ways to reduce the software overhead and the bottleneck it produces for message passing systems.

The message passing software problems are not as noticeable with the state-of-the-art interconnection solutions for multiple personal computers and workstations which are relative slow. The interconnection means involve serial, high-latency Token Ring and Ethernet connections, which do not provide the parallel characteristics and low-latency concepts required for modern interconnect systems. The characteristics that are required include the ability to dynamically and quickly establish and break element interconnections, to do it cheaply and easily in one chip, to have expandablity to many thousands of elements, to permit any length, non-calibrated interconnection wire lengths, to solve the distributed clocking problems and allow future frequency increases, and to permit parallel establishment and data transmittal over N switching paths simultaneously.

Amongst the most commonly used networks for digital communication between processors are the Ethernet or Token Ring LAN networks. "Ethernet: Distributed Packet Switching for Local Computer Networks" Communications of the ACM, July 1976, Vol.19, No. 7, pp 393–404; and "Token-Ring Local-Area Networks and Their Performance", W. Bux, Proceedings of the IEEE, Vol. 77, No.2, February 1989, pp 238–256; are representative articles which describe this kind of network, which provide a serial shared medium used by one node at a time to send a message to another node or nodes. The present invention is a replacement for this the Ethernet and Token-Ring networks that supports a parallel medium capable of multiple simultaneous transfers.

U.S. Pat. No. 4,803,485—LAN COMMUNICATION SYSTEM, represents one LAN approach which use of the present inventions would replace. This patent describes a medium conversion adapter similar to the present invention, but for adapting various bus protocols to a communication system having multiple transmission media segments in a ring configuration, like a token ring or LAN. The present invention differs in that it adapts multiple transmission segments in an unbuffered multi-stage parallel transfer configuration, that gets latencies in the sub-microsecond range, rather than in the millisecond range of LAN's. This differences will be of value in the future.

The distributed and fully parallel switch utilized herein to provide greatly improved interconnection properties over the Ethernet or Token Ring LAN networks is the ALLNODE Switch (Asynchronous, Low Latency, inter-NODE switch), which is disclosed in U.S. Ser. No. 07/677,543 and adapted by the present invention to perform the switching of converted bus interfaces at low latencies and high bandwidths. The ALLNODE switch provides a circuit switching capability at high bandwidths, and includes distributed switch path connection set-up and tear-down controls individually within each switch—thus providing parallel set-up, low latency, and elimination of central point failures. We will further describe in the detailed description a way whereby the ALLNODE switch and the present invention can be used to solve the bus-based processor interconnection problem effectively.

SUMMARY OF THE INVENTIONS

The present invention is a method and apparatus for reducing the software overhead of message passing in parallel systems. The reduction is realized by providing special-purpose hardware to assist in constructing each data message to be sent through an interconnection network to any of a plurality of processors connected to the network. In general, message passing systems require every message be prefixed with a message header describing the key control parameters of the message. The Message Header defines all the variable information that the sending and receiving functions must know in order to transmit a message over the switch network.

Normally, it is the task of the software to construct the message header for every message individually and to transmit the header first, prefixed to every message. The disclosed invention relieves the software of the task of constructing the message header and uses special-purpose hardware to do the job much quicker and more efficiently. This provides a very high speed message sending mode. The software is relieved of the task of constructing the message header for every message, and also does not have to waste valuable cycle times for transmitting the message header to the hardware over the processor bus for every message. This special high speed mode is called HARDWARE BUILT MESSAGE-HEADER (HBM) Mode.

The preferred switching means for implementing the switching network that will take the greatest advantage of the disclosed high speed message mode is the basic digital asynchronous and unbuffered switching concept disclosed in U.S. Ser. No. 07/677,543, "All-Node Switch, An Unclocked, Unbuffered Asychronous switch Apparatus" by H. T. Olnowich et al. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switch can be cascaded with other identical apparatus devices to form an interconnection network among any number of system elements or nodes. The network would have the characteristics for full parallel interconnection.

BRIEF DESCRIPTION OF THE DRAWINGS

FIG. 4 illustrates the interconnections required to a four input and four output (4×4) crossbar switching apparatus to provide full interconnection amongst four nodes.

FIG. 10 shows an expansion of the basic 4 bit wide Allnode Switch interconnection paths to a byte wide implementation.

DETAILED DESCRIPTION OF THE PREFERRED METHOD and EMBODIMENT

The present invention is a method and apparatus for reducing the software overhead of message passing in parallel systems. Normally, it is the task of the software to construct the message header for every message individually and to transmit the header first, prefixed to every message. The present invention relieves the software of the task of constructing the message header and uses special-purpose hardware to do the job much quicker and more efficiently. The invention is applicable to implementing high performance message passing modes between multiple parallel nodes interconnected by a multi-stage switching network.

Figure 1:
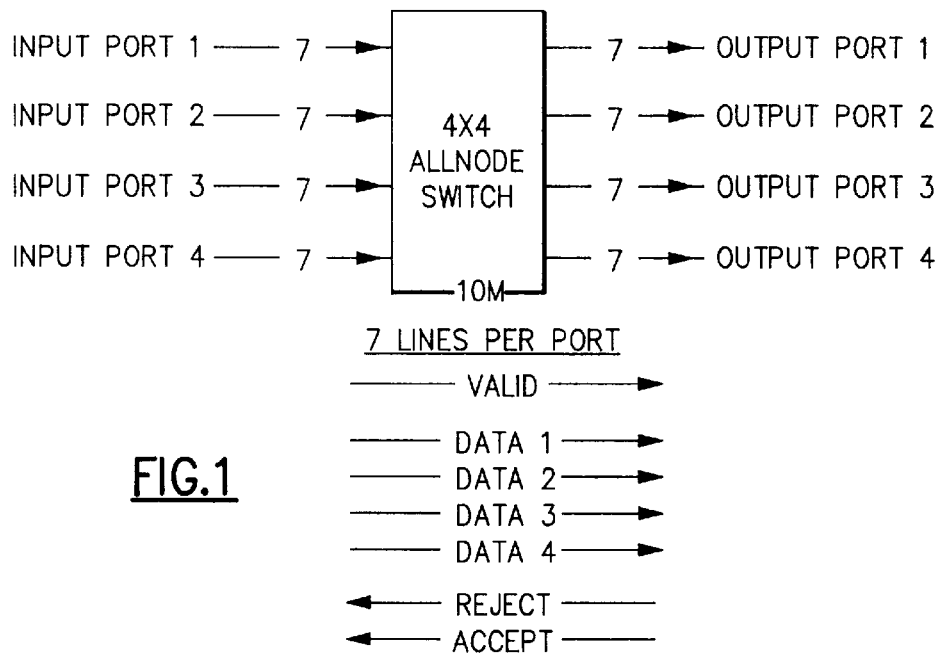
FIG. 1 illustrates generally our preferred embodiment of the switching apparatus used to support the present invention of generating high speed message passing communications.

The preferred switching means for implementing the switching network that will take the greatest advantage of the disclosed high speed message mode is the basic digital asynchronous and unbuffered switching techniques disclosed in the parent application, the ALLNODE Switch (Asynchronous, Low Latency, inter-NODE switch), which is disclosed in U.S. Ser. No. 07/677,543. FIG. 1 illustrates generally the basic Allnode switching apparatus 10 m for interconnecting four nodes through input and output ports of the parent Allnode switch.

Figure 2:
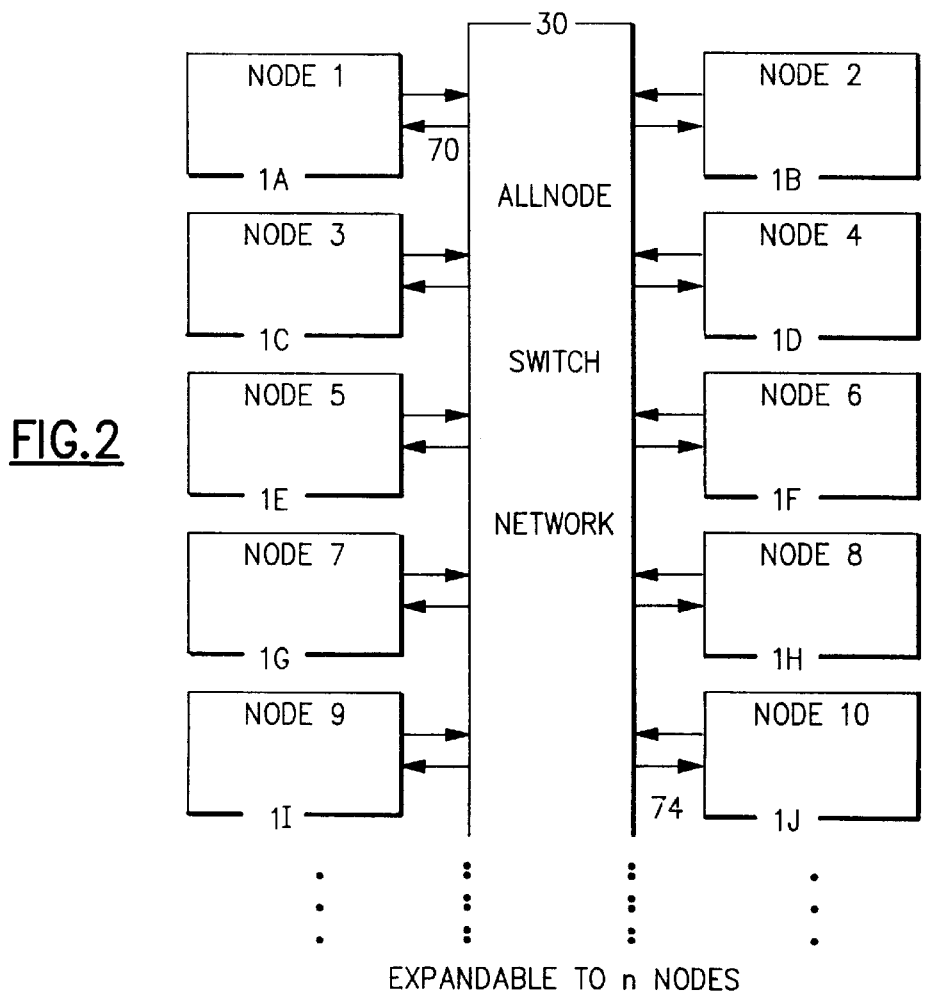
FIG. 2 illustrates generally the method used to interconnect multiple nodes of a parallel system using a switching network.

Referring to FIG. 2, the preferred embodiment for interconnecting n nodes of a parallel system via a multi-stage, interconnection network 30 using switching elements is shown. The preferred switching elements of network 30 is the basic asynchronous and unbuffered Allnode switching concept disclosed in the parent application U.S. Ser. No. 07/677,543 and modified by the present invention to incorporate camp-on and priority interrupt qualities. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network 30 would have the characteristics for full parallel interconnection.

The preferred embodiment uses only unidirectional interfaces, and therefore FIG. 2 shows the switch interface 70 to be comprised of two unidirectional sets of lines, one carrying data from node 1A, and one carrying data to the switch network from node 1A, and one carrying data from the switch network to node 1A.

It is here understood that the FIGS. 1 and 3 to 9 are illustrations which are common to U.S. Ser. No. 07/677,543, the parent application which is incorporated herein by reference as to all of its contents. FIGS. 1 and 3 to 9 refer to a 4×4 crossbar implementation of the ALLNODE Switch to illustrate the principles and speed of the switching concept.

4×4 Crossbar Allnode Switch—FIGS. 3–9

Figure 3:
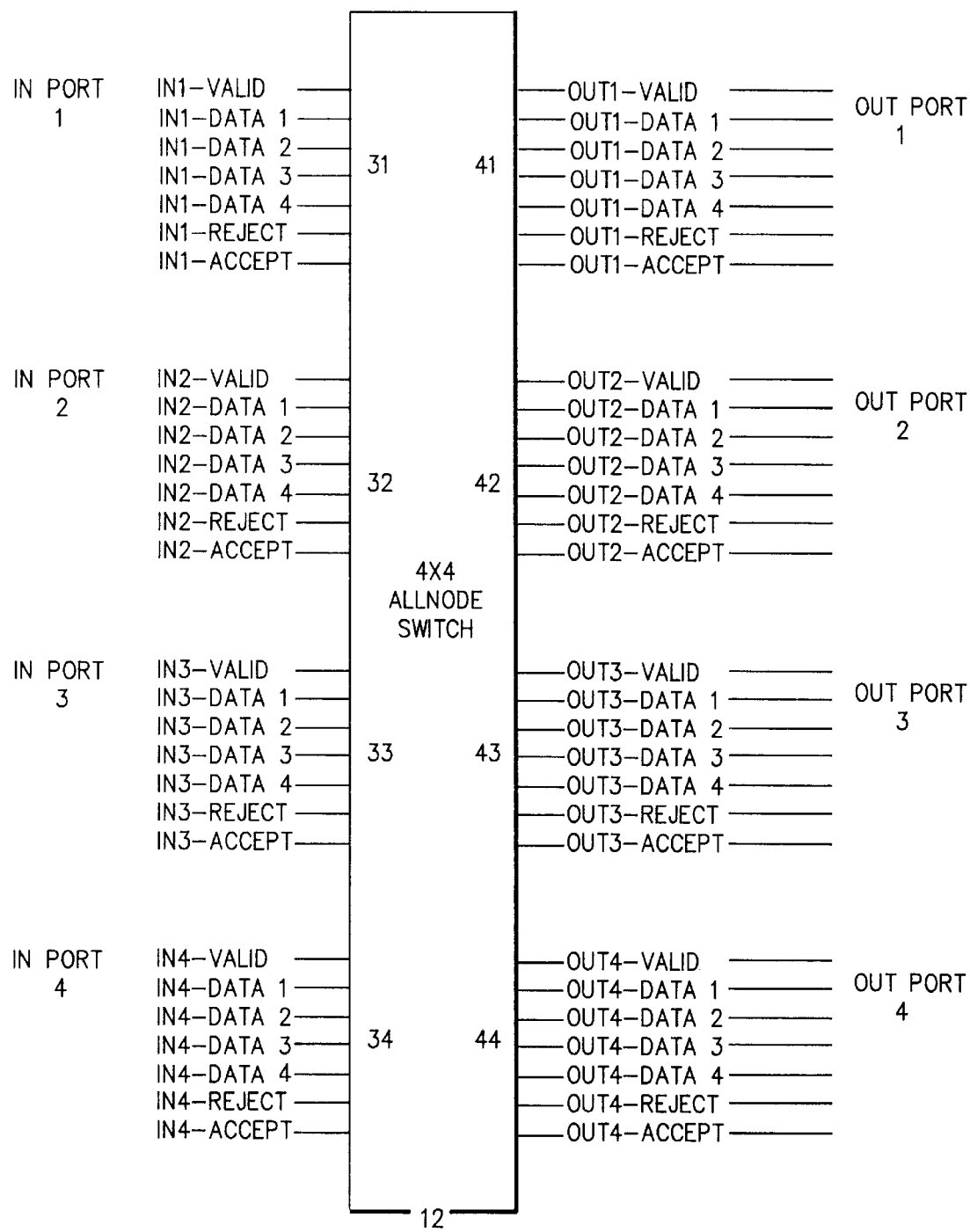
FIG. 3 illustrates the parent four input and four output (4×4) crossbar switching apparatus, which operates asynchronously and has the capability of being modified to provide the disclosed improvements.

Referring to FIG. 3, the preferred embodiment is a 4×4 switching apparatus 12, where the function of the present invention is to provide a means of connecting any of 4 sets of digital, analog, or optical inputs on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 3. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX- indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface set requires only 7 signals, as shown in FIG. 3, to transmit and control and data through the network 30—the digital data and control transfer width is ½ byte (4 bits) at a time. The signals required are:

DATA: 4 parallel signals used to command switch connections and transmit digital data messages or digital control headers.

VALID: When active, indicates that a digital message, control header, or analog waveform is in the process of being transmitted. When inactive, indicates a RESET command and causes all switches to reset to the IDLE state.

REJECT: Signal flow is in the opposite direction from the DATA and VALID signals. When active, it indicates that a REJECT or error condition has been detected.

ACCEPT: Signal flow is in the same direction as the REJECT signal. When in the low state, it indicates that a message is in the process of being received and checked for accuracy. When active, it indicates the message has been received correctly.

As illustrated by FIG. 4 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 4 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four nodes (1A, 1B, 1C, and 1D) by connecting the 4×4 ALL-NODE switching apparatus 10 as shown in FIG. 3. Each node 1A, 1B, 1C, and 1D has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 5:
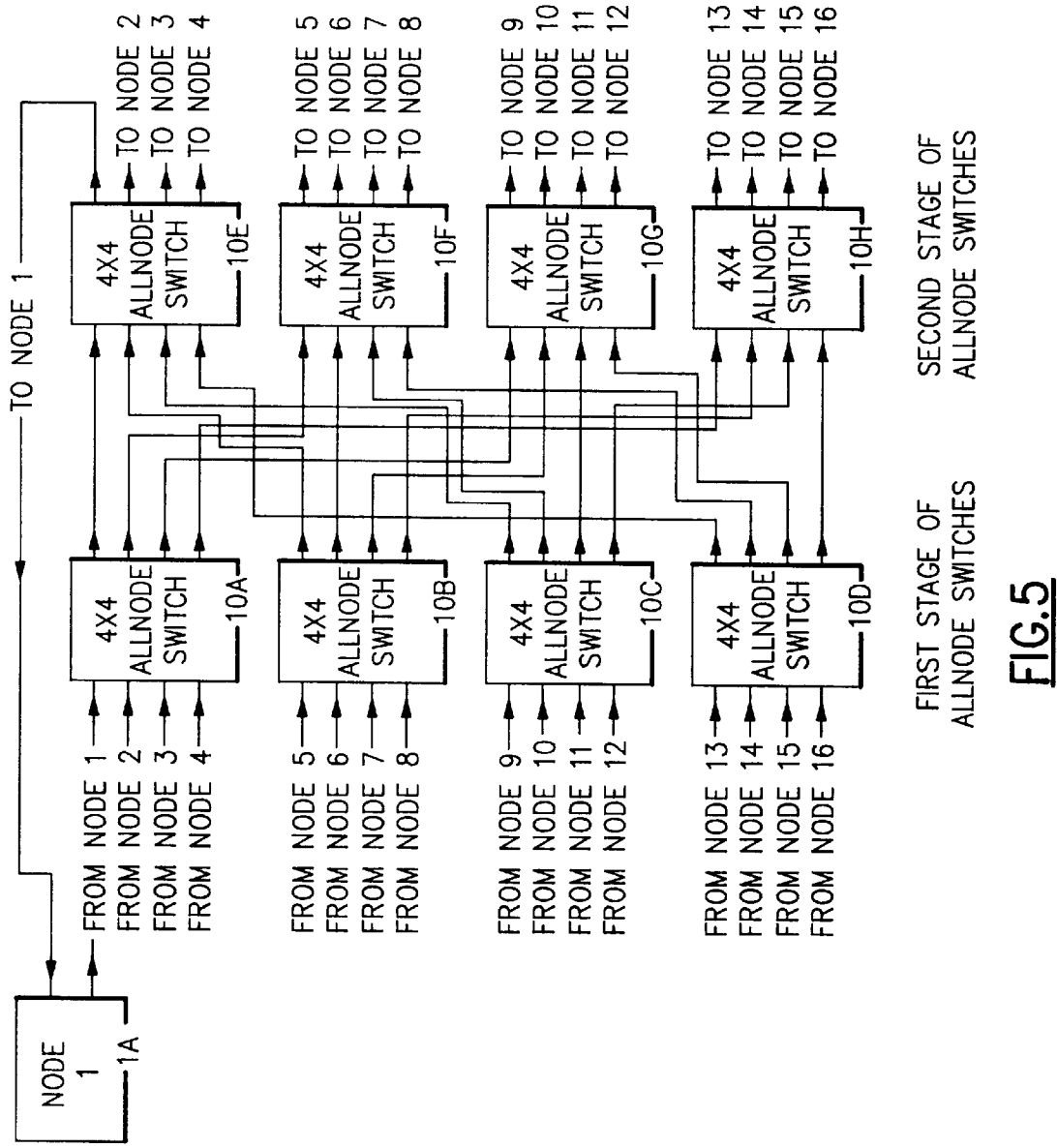
FIG. 5 shows a typical method for cascading the 4×4 asynchronous switching apparatus devices to accommodate parallel systems having more than 4 nodes.

Referring to FIG. 5, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 12 blocks by using three stages, four stages, etc. in a similar manner.

Figure 6:
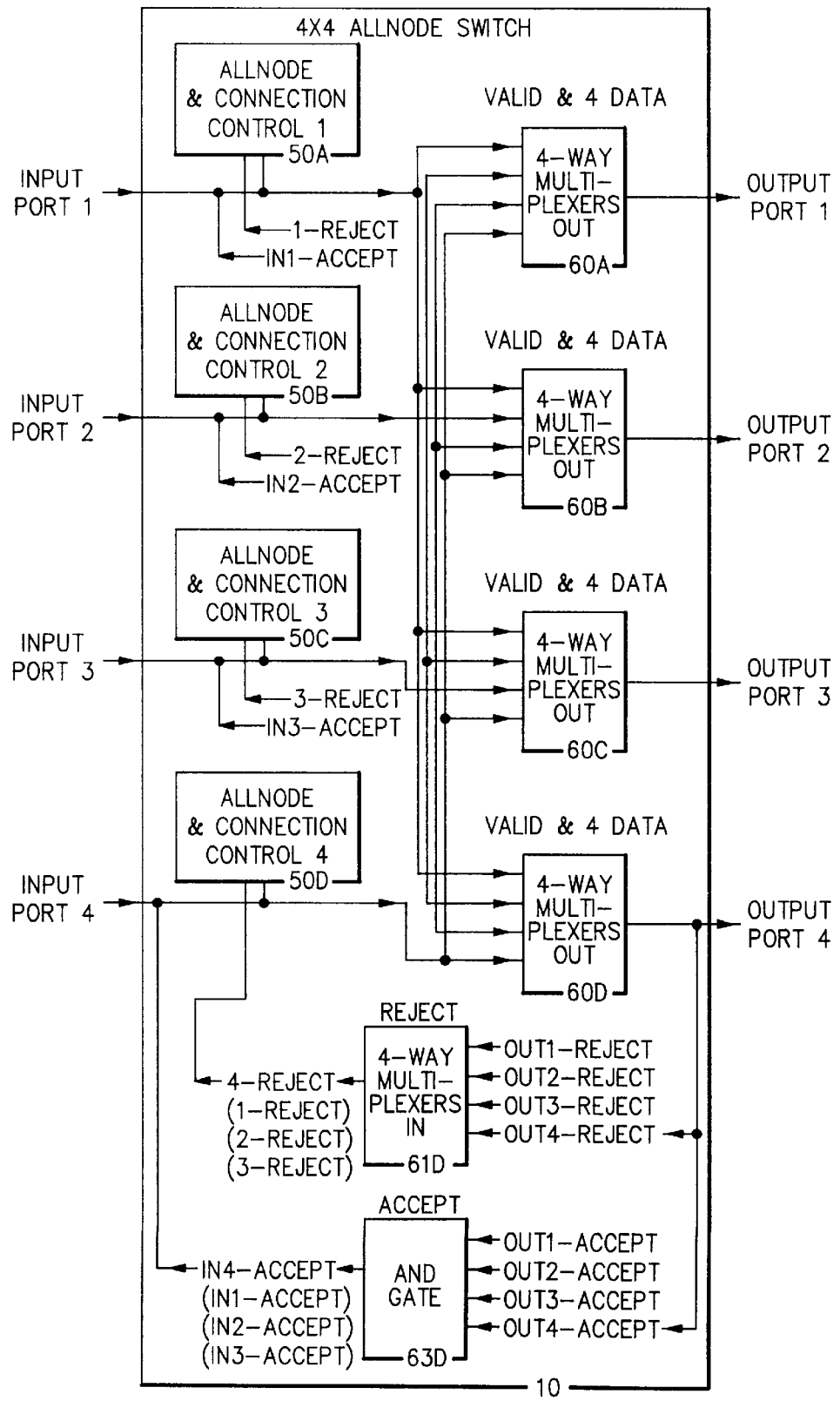
FIG. 6 shows a schematic block diagram of the simple digital data flow and control path implementations of the 4×4 asynchronous switching apparatus, which has the capability of being modified by the present invention to provide fully parallel switching means for interconnecting up to four system nodes for the purpose of transferring digital data.

Referring to FIG. 6, a functional diagram of the simple data flow across ALLNODE switching apparatus 10 is illustrated. The VALID and four data lines at each input port, inside the switch, and at each output port are represented by a single line in FIG. 6 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 12 with a unidirectional signal flow from input port to output port, multiplexer 61 D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 7:
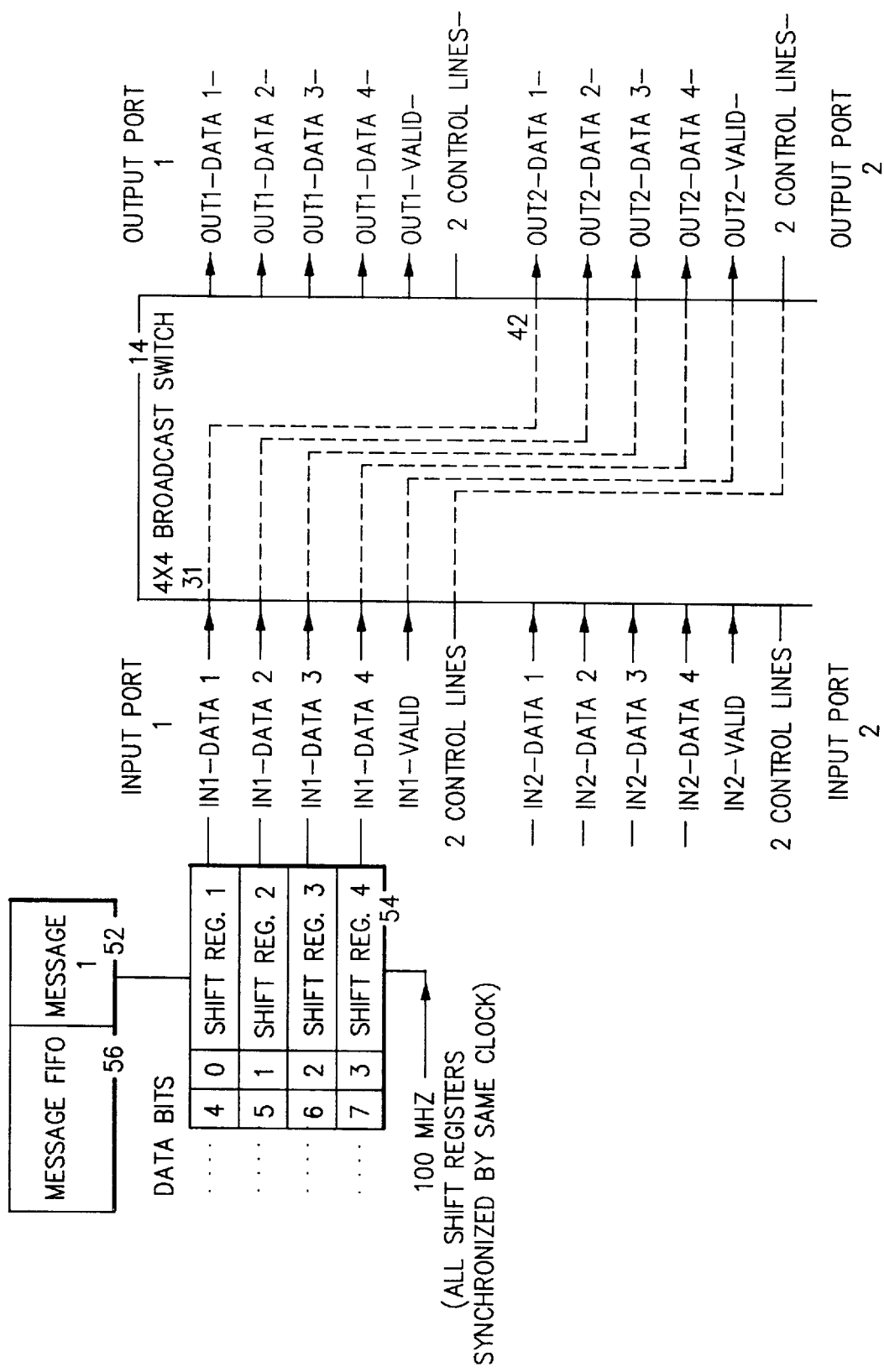
FIG. 7 illustrates a typical method for generating parallel control and and multiple line serial digital data information to be sent to the 4×4 prior parent embodiment of the invention switching apparatus over four synchronous data lines.

Referring to FIG. 7, blocks 56, 52, and 54 illustrate a typical method for generating multi-line (parallel)/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources (31, 32, 33, and 34 of FIG. 3) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 7 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 8:
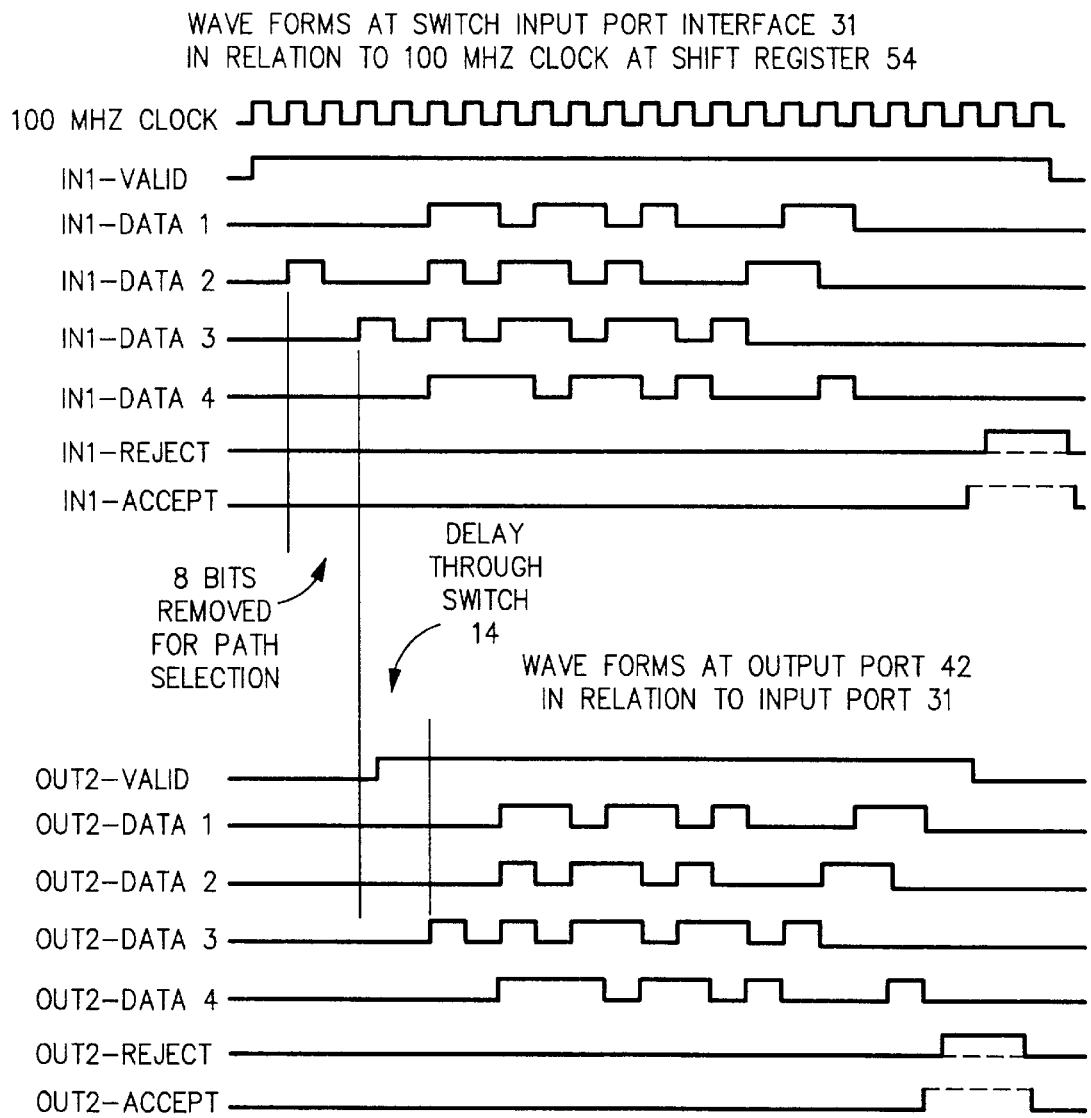
FIG. 8 shows a typical timing diagram for routing the digital interface signals arriving at one input port of the 4×4 prior parent embodiment of the invention switching apparatus to one output port.

Referring to FIG. 8, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 9:
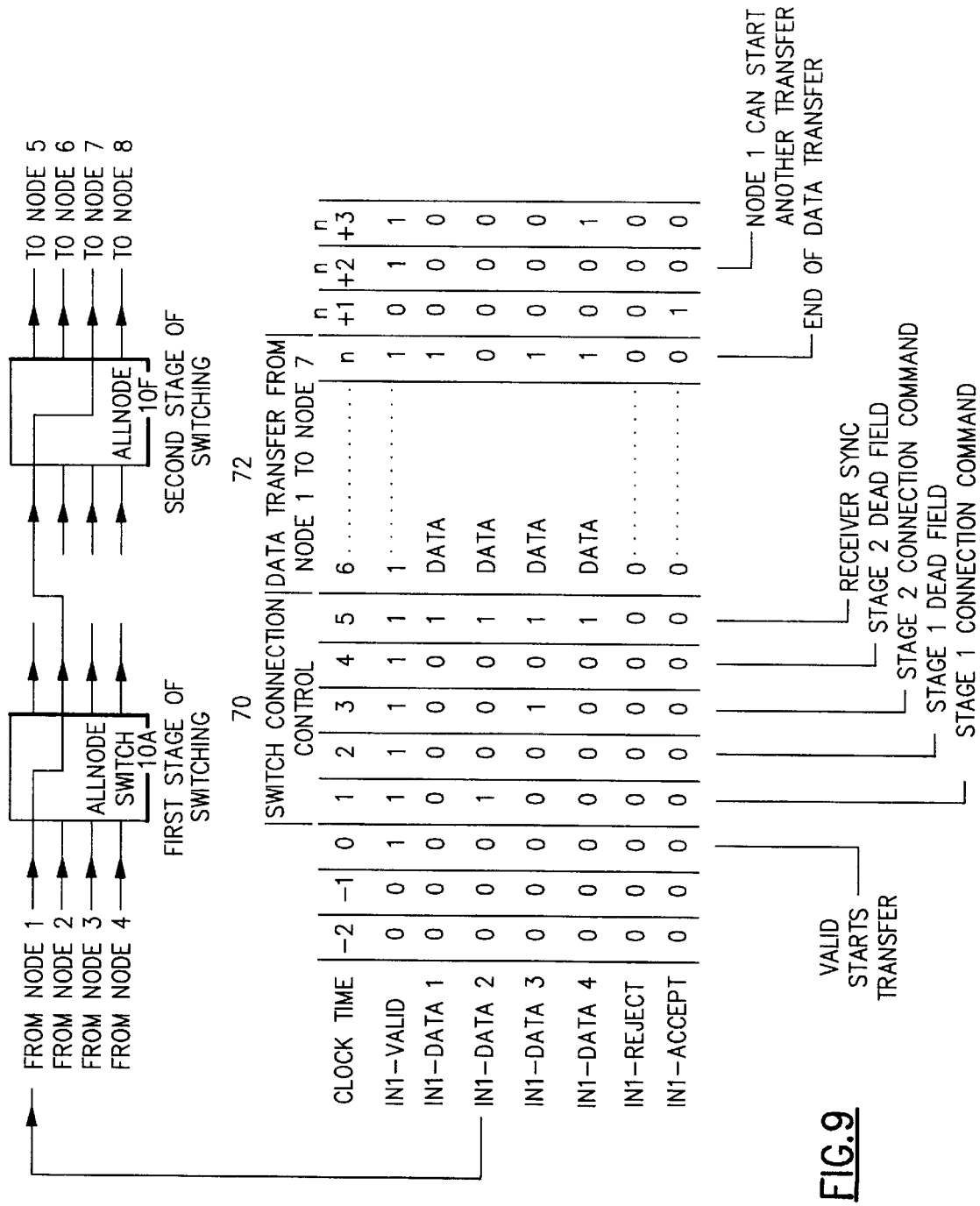
FIG. 9 illustrates the typical method of selecting and establishing a transmission path through a network comprised of the invention switching apparatus for the purpose of sending digital data from one node to another.

Referring to FIG. 9, a typical example of the exact serial bit patterns and control signal activation is shown for sending control and digital data information to switching apparatus 10. The example references the cascaded, two stage switching network shown in FIG. 5 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 5. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 8. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 8. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodient, as shown in FIG. 8 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 7), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:
1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

Figure 11:
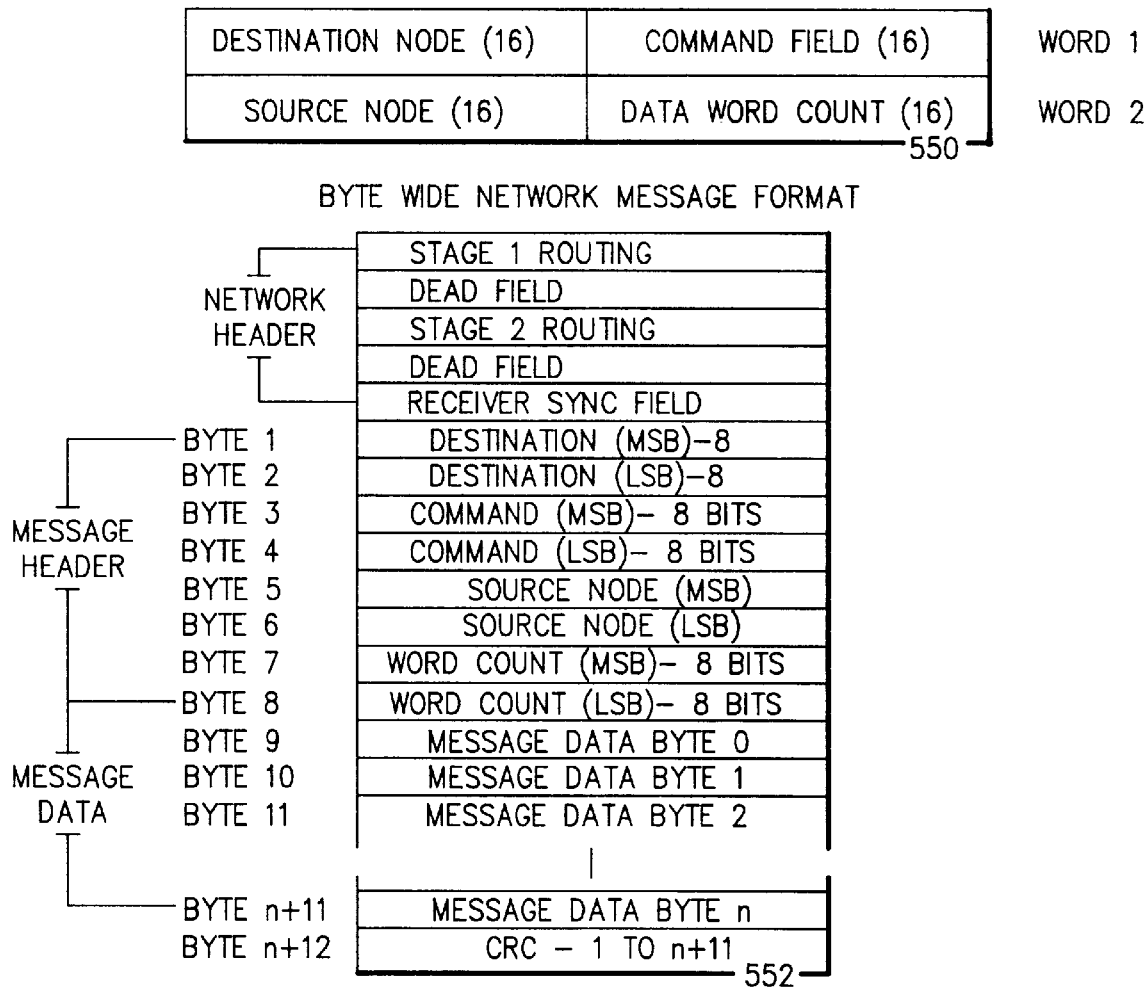
FIG. 11 shows a typical data message and message header used the the Allnode Switch network, in the format generated by software and the format sent through the switch network.
Figure 12:
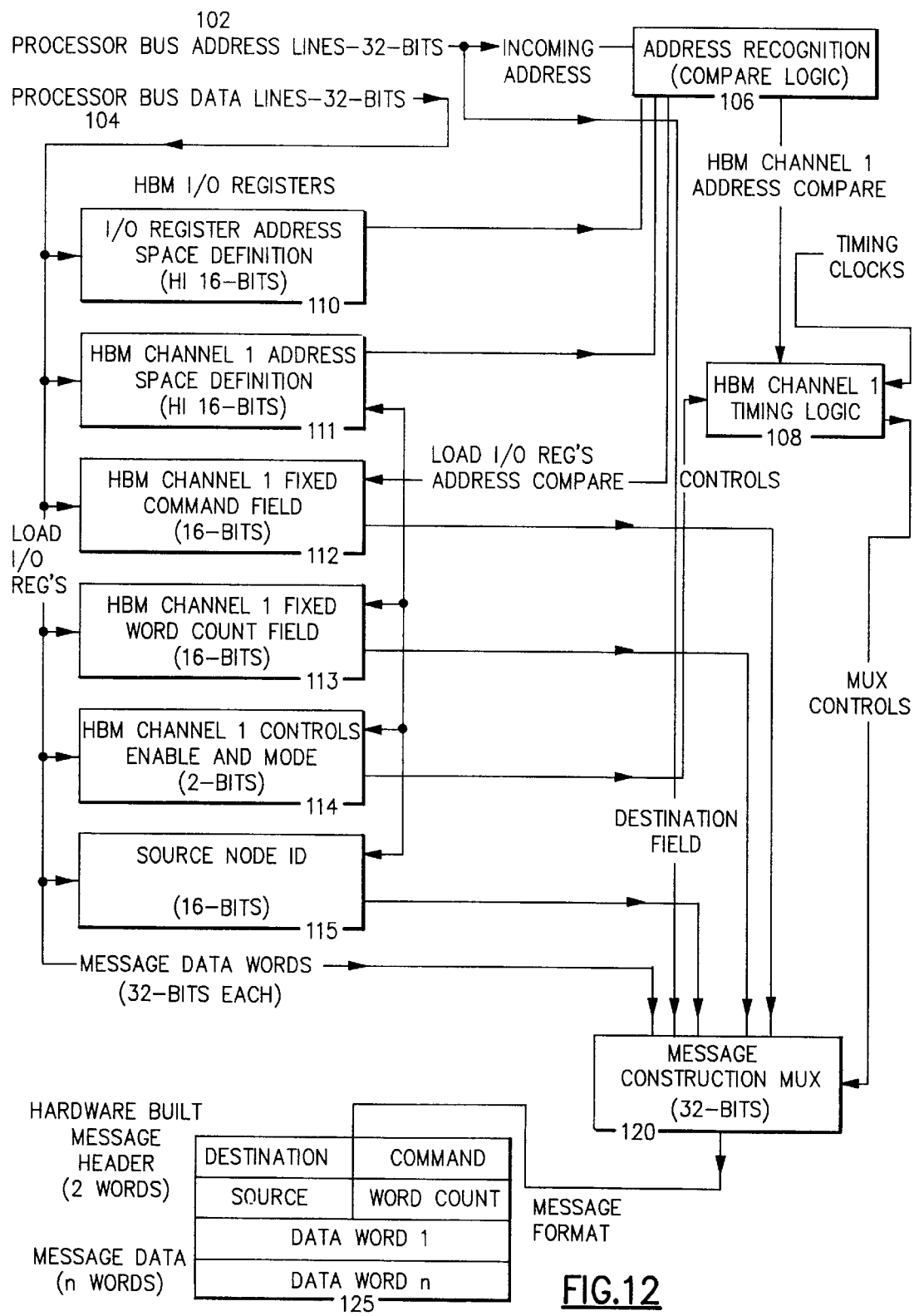
FIG. 12 shows the hardware implementation details of the present invention of using special-purpose hardware to assist the software in the generation of message headers for implementing a high speed message passing mode.

Message Header Generation—FIGS. 10–12

Referring to FIG. 10, an extension of the basic 4 bit wide Allnode Switch 10 m is shown as switch 4. The expansion is from 4 to 8 data lines per port for expanding the interconnection paths to switch 10 to a byte-wide implementation. This byte-wide implementation is the preferred embodiment of the Allnode Switch to be used in conduction with the present invention.

Referring to FIG. 11, the message format used by the preferred embodiment of network 30 is shown. The network 30 requires that every data message as generated by a processing node have a two 32-bit word Message Header, as shown by block 550. Word 1 of the Message Header contains the destination node number (DID value) and defines which node is to receive the valid message, and the command field defining the type of message and other message control parameters. Word 2 of the message header contains the source node number (SID value) that is generating the data message word count of the actual message data (excluding the two message header words). The 32-bit format of the data message and header, as shown by block 550, is converted to a byte-wide format for transmission through the network comprised of the preferred byte-wide Allnode switches. The byte wide content of messages sent through network 30 is shown by block 552. The Network Header is generated from the destination field and prefixes the message with the Network Header as shown by block 552 to be used by network 30 to route the valid message to the proper destination and to synchronize the receiving node when the data arrives. Network 30 strips the Network Header from the valid message as it makes its way through the network, stage by stage, and the receiving node strips the RECEIVER SYNC FIELD after it gets in synchronization with the incoming message. Therefore, the actual valid message that gets moved from the sending node to the receiving node over network 30 is the Message Header and Message Data portion of the message format shown in block 552. The Message Header portion of block 552 is the exact same two word header shown by block 550, just broken into individual bytes for transmission over the byte-wide network 30. The Message Data portion of block 552 are the data words of the actual message, which is broken into individual bytes for transmission over network 30. The last portion of block 552 is a CRC field which is sent last and used to check the accuracy of the valid message.

Turning now to the preferred solution for reducing the software overhead problem for message passing by provide special hardware to assist the software in constructing a message to be sent through the network 30. The preferred message passing system requires every message be prefixed with a message header describing the key control parameters of the message, as shown in FIG. 10. Normally, it is the task of the software to construction the message header for every message individually and to transmit the header first, previous to every message. The disclosed invention relieves the software of the task of constructing the message header and uses special-purpose hardware to do the job much quicker and more efficiently for certain types a messages. This special high speed mode is called HARDWARE BUILT MESSAGE-HEADER (HBM) Mode.

The preferred embodiment of the HBM mode uses the functions shown by the block diagram in FIG. 12 to construct message headers. The HBM is used to prefix all data it receives with a message header that uses two fixed header words with all fields held constant except for the destination field.

The fixed portion of the header is constructed by the hardware based on the contents of I/O registers which initialized previously and reused continually to define the fixed word count, command field, and fixed source node field. The destination field is normally the only variable header field and can be assigned as part of the address field of the Processor Bus operation that initiates the message data transfer. Two typical possibilities for designating the destination field are as follows:

|  | Processor Bus ADDRESS - 16 bits | DESTINATION ADDRESS | WORD COUNT |  |
|---|---|---|---|---|
| 512 NODE OPTION | FDR HBMs MSB      LSB | 9 bits | 5 bits | 00 Byte Addr |
|  | OR |  |  |  |
|  | Processor Bus ADDRESS - 13 bits | DESTINATION ADDRESS | WORD COUNT |  |
| 4096 NODE OPTION | FDR HBMs MSB      LSB | 12 bits | 5 bits | 00 Byte Addr |

The two typical destination address assignments permit HBMs operate in either of two modes 512 NODE OPTION or 4096 NODE OPTION. In 512 mode, up to 512 destination nodes can be specified and 16-bits of processor bus address are used to map this particular address space (as defined previously by an I/O register) to the address space that the processor must write to if it wishes the hardware to construct the message header. Note that additional address spaces could be assigned as address space that the processor must write to if it wishes the software to construct the message header. Thus, hardware assisted and software built headers can co-exist and be intermixed on a dynamic basis. In 4096 mode, up to 4096 destination nodes can be specified and 13-bits of processor bus address recognition are required.

Before using HBMs, the Hardware Built Message Header option must be enabled by writing an I/0 Registers in the hardware assist logic with the following parameters: HBM address space definition, the HBM command field, word count, mode, and HBM Enable control bits. The hardware built headers are used to prefix every message sent to the HBM address range, and this is accomplished automatically by the hardware once the HBM I/O Registers have been loaded an enabled. The same hardware built header is continually issued for every message sent to the HBM memory space with only the destination field being varied based on the low order processor bus address bits. The low order 7 bits of address are generally ignored and can assume any word aligned value and arrive in any order and message data will be sent over the network in time sequential order prefixed by the hardware built header, regardless of address order. However, an address having the 7 low order bits equal to zeroes should always and only be used to indicate the beginning of a new message. This will act as a synchronization check between the processor and the hardware assist logic. Any "Out of Sync" condition will be detected and reported to the processor as an error.

Note that the HBM feature can be used to send messages of the same size and command very quickly and efficiently. It is extremely helpful if the processor is mainly sending messages of the same size and type. For the unusual messages that are not of this size and type, the processor can use software built headers and intermix them in any manner with hardware built headers. For more flexibility in sending various sizes and types of HBM's, the hardware assist logic could implement multiple HBM channels with each having a different size and type. The software would select the each HBM channel individually based on recognizing a 16-bit different high order address space on the processor bus.

Referring to FIG. 12, a typical layout of the 512 message header generation logic for one HBM channel is shown. The processor (one node of a parallel processing system) sends messages to the HBM channel via the processor address bus 102 and data bus 104. Prior to sending messages the processor loads I/O registers 111 to 115 by addressing the I/O address registers individually over bus 104. Block 106 compares every I/O address placed on bus 102 to determine if the address compares to the address range defined in register 110. If it does, block 106 detects a compare and causes the data sent over bus 104 to be loaded into the appropriate I/O register 111 to 115. Once the I/O Registers are loaded and the HBM is enabled via register 114, the processor can begin to send HBM messages to the address space defined by register 111. Block 106 then compares every I/O address placed on bus 102 to determine if the address compares to either the address range defined in register 110 or the address space for HBM Channel 1 as defined by register 111. If there is a compare to register 111, block 106 starts the processing of an HBM by activating block 108. Block 108 controls MUX 120 so that hardware message header word 1 of FIG. 11 is gated through MUX 120 first, and contains the destination field as defined by bus 102 plus the command and field as defined by register 112. Next hardware message header word 2 of FIG. 11 is gated through MUX 120 containing the source node field as defined by register 115 and the word count field as defined by register 113. Finally the message data words as they are received over bus 104 are gated through the MUX 120. The final result is the generating of message 125, as prefixed by the hardware built message header words.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A switch network comprising:

a plurality of switch apparatuses cascaded into a plurality of stages, said switch apparatuses each including a plurality of switch inputs and a plurality of switch outputs, of the switch outputs included on each of said switch apparatuses each coupled to a different one of the switch apparatuses via a switch input of said different one of the switch apparatuses, switch outputs of last stage switch apparatuses each comprising a network output port and switch inputs of first stage switch apparatuses each comprising a network input port; and the network output ports each coupled to a network input port through one of a plurality of nodes, each of said nodes comprising means for receiving a data message from a coupled network output port, and means for sending a data message to a coupled network input port, said data message to a coupled network input port including a path connection request that identifies a destination network output port;

said switch apparatuses each further including:

connection means for establishing a point-to-point communication path between any one of the network input ports and any one of the network output ports in response to a point-to-point path connection request received at said any one of the network input ports, said point-to-point communication path for transmitting a data message received at said any one of the network input ports to said any one of the network output ports; and asynchronous connection means for establishing asynchronously a plurality of concurrently active point-to-point communication paths, in response to a plurality of point-to-point path connection requests received at a plurality of the network input ports, for transmitting concurrently a plurality of data messages received at said plurality of the network input ports to a plurality of the network output ports;

said nodes each further comprising:

message header generation means for automatically generating and prefixing to a selected data message to a coupled network input port a message header having a plurality of data fields, said message header generation means implemented in hardware and automatically generating the message header in response to being selectively activated by said means for sending a data message to a coupled network input port;

wherein said plurality of data fields includes:

a receiving node ID for identifying a receiving node of the data message to a coupled network input port;

a sending node for ID for identifying a sending node of the data message to a coupled network input port; and a data message length field for identifying a size of the data message to a coupled network input port; and wherein the message header generation means includes means for maintaining selected ones of the plurality of data fields constant for each said selected data message to a coupled network input port.

2. The switch network according to claim 1, wherein the means for maintaining selected ones of the plurality of the data fields constant includes:

means for preloading constant field data before being selectively activated by said means for sending a data message to a coupled network input port; and means for receiving from said means for sending a data message to a coupled network input port variable field data for data fields not selected to be maintained constant.

3. The switch network according to claim 2, wherein the message header generation means is activated by said means for sending a data message to a coupled network input port sending only variable field data to the means for receiving.

4. The switch network according to claim 3, wherein said nodes each further include a plurality of said message header generation means coupled to said means for sending a data message to a coupled network input port, one of the plurality of said message header generation means selectively activated by the means for sending a data message to a coupled network input port for automatically generating and prefixing to said selected data message to a coupled network input port the message header.

5. The switch network according to claim 4, wherein said one of the plurality of said message header generation means is activated by said means for sending a data message to a coupled network input port sending only said variable field data to the means for receiving of said one of the plurality of said message header generation means.

6. A switch network comprising:

a switch apparatus including a plurality of switch inputs and a plurality of switch outputs; and the switch outputs each coupled to a switch input through one of a plurality of nodes, each of said nodes comprising means for receiving a data message from a coupled switch output, and means for sending a data message to a coupled switch input, said data message to a coupled switch input including a path connection request that identifies a destination switch output;

said switch apparatus further including:

connection means for establishing a point-to-point communication path between any one of the switch inputs and any one of the switch outputs in response to a point-to-point path connection request received at said any one of the switch inputs, said point-to-point communication path for transmitting a data message received at said any one of the switch inputs to said any one of the switch outputs; and asynchronous connection means for establishing asynchronously a plurality of concurrently active point-to-point communication paths, in response to a plurality of point-to-point path connection requests received at a plurality of the switch inputs, for transmitting concurrently a plurality of data messages received at said plurality of the switch inputs to a plurality of the switch outputs;

said nodes each further comprising:

message header generation means for automatically generating an prefixing to a selected data message to a coupled switch input a message header having a plurality of data fields, said message header generation means implemented in hardware and automatically generating the message header in response to being selectively activated by said means for sending a data message to a coupled switch input;

wherein said plurality of data fields include:

a receiving node ID for identifying a receiving node of the data message to a coupled switch input;

a sending node ID for identifying a sending node of the data message to a coupled switch input; and a data message length field for identifying a size of the data message to a coupled switch input; and wherein the message header generation means includes means for maintaining selected ones of the plurality of data fields constant for each said selected data message to a coupled switch input.

7. The switch network according to claim 6, wherein the means for maintaining selected ones of the plurality of the data fields constant includes:

means for preloading constant field data before being selectively activated by said means for sending a data message to a coupled switch input; and means for receiving from said means for sending a data message to a coupled switch input variable field data for data fields not selected to be maintained constant.

8. The switch network according to claim 7, wherein the message header generation means is activated by said means for sending a data message to a coupled switch input sending only variable field data to the means for receiving.

9. The switch network according to claim 8, wherein said nodes each further include a plurality of said message header generation means coupled to said means for sending a data message to a coupled switch input, one of the plurality of said message header generation means selectively activated by the means for sending a data message to a coupled switch input for automatically generating and prefixing to said selected data message to a coupled switch input the message header.

10. The switch network according to claim 9, wherein said one of the plurality of said message header generation means is activated by said means for sending a data message to a coupled switch input sending only said variable field data to the means for receiving of said one of the plurality of said message header generation means.

11. A switch network comprising:

a switch apparatus including a plurality of switch inputs and a plurality of switch outputs; and a plurality of nodes each coupled to one switch input and one switch output, each of said nodes comprising means for receiving a data message from a coupled switch output, and means for sending a data message to a coupled switch input, said data message to a coupled switch input including a path connection request;

said switch apparatuses each further including:

connection means for establishing a communication path between any one of the switch inputs and any one of the switch outputs in response to a path connection request received at said any one of the switch inputs, said communication path for transmitting a data message received at said any one of the switch inputs to said any one of the switch outputs;

said nodes each further comprising:

message header generation means for automatically generating and prefixing to a selected data message to a coupled switch input a message header having a plurality of data fields, said message header generation means implemented in hardware and automatically generating the message header in response to being selectively activated by said means for sending a data message to a coupled switch input;

wherein said plurality of data fields include:

a receiving node ID for identifying a receiving node of the data message to a coupled switch input;

a sending node ID for identifying a sending node of the data message to a coupled switch input; and a data message length field for identifying a size of the data message to a coupled switch input; and wherein the message header generation means includes means for maintaining selected ones of the plurality of data fields constant for each said selected data message to a coupled switch input.

12. The switch network according to claim 11, wherein the means for maintaining selected ones of the plurality of the data fields constant includes:

means for preloading constant field data before being selectively activated by said means for sending a data message to a coupled switch input; and means for receiving from said means for sending a data message to a coupled switch input variable field data for data fields not selected to be maintained constant.

13. The switch network according to claim 12, wherein the message header generation means is activated by said means for sending a data message to a coupled switch input sending only variable field data to the means for receiving.

* * * * *